United States Patent
Hattori

(10) Patent No.: US 10,218,235 B2
(45) Date of Patent: Feb. 26, 2019

(54) ROTOR OF ROTARY ELECTRIC MACHINE

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 262 days.

(21) Appl. No.: 15/321,475

(22) PCT Filed: Jun. 17, 2015

(86) PCT No.: PCT/IB2015/000970
§ 371 (c)(1),
(2) Date: Dec. 22, 2016

(87) PCT Pub. No.: WO2015/198118
PCT Pub. Date: Dec. 30, 2015

(65) Prior Publication Data
US 2017/0163110 A1    Jun. 8, 2017

(30) Foreign Application Priority Data
Jun. 27, 2014  (JP) ................. 2014-133240

(51) Int. Cl.
*H02K 1/32* (2006.01)
*H02K 1/27* (2006.01)
*H02K 9/00* (2006.01)

(52) U.S. Cl.
CPC ............... *H02K 1/32* (2013.01); *H02K 1/274* (2013.01); *H02K 1/2766* (2013.01); *H02K 9/00* (2013.01)

(58) Field of Classification Search
CPC ............ H02K 1/20; H02K 1/32; H02K 1/325; H02K 5/12; H02K 5/20; H02K 9/005;
(Continued)

(56) References Cited

U.S. PATENT DOCUMENTS

| | | | |
|---|---|---|---|
| 2013/0278091 A1* | 10/2013 | Ohashi | H02K 1/32 310/58 |
| 2016/0036276 A1* | 2/2016 | Yamagishi | H02K 1/32 310/59 |
| 2016/0322874 A1* | 11/2016 | Yoshinori | H02K 1/32 |

FOREIGN PATENT DOCUMENTS

| | | |
|---|---|---|
| JP | 2006-067777 A | 3/2006 |
| JP | 2008-086130 A | 4/2008 |

(Continued)

*Primary Examiner* — Nguyen Tran
(74) *Attorney, Agent, or Firm* — Sughrue Mion, PLLC

(57) ABSTRACT

A rotor includes a rotor core and a permanent magnet. A core refrigerant passage is configured to guide refrigerant supplied from a shaft refrigerant passage to an outer peripheral end of the rotor core. The first refrigerant passage extends from an inner peripheral end of the rotor core to a position inside the permanent magnet. The first refrigerant passage is placed at a position deviating from a q-axis of the rotary electric machine in a circumferential direction. The second refrigerant passage is provided on the q-axis. The second refrigerant passage extends from the outer peripheral end of the rotor core toward an inner peripheral side in the rotor core. The third refrigerant passage configured to provide communication between the first refrigerant passage and the second refrigerant passage, the third refrigerant passage being placed at a position deviating from the second refrigerant passage in a rotor axis direction.

7 Claims, 8 Drawing Sheets

(58) Field of Classification Search
CPC ............ H02K 9/12; H02K 9/19; H02K 9/193; H02K 9/197
USPC .................................. 310/52, 54, 57, 58, 59
See application file for complete search history.

(56) References Cited

FOREIGN PATENT DOCUMENTS

| | | |
|---|---|---|
| JP | 2008-228522 A | 9/2008 |
| JP | 2008-228523 A | 9/2008 |

* cited by examiner

ROTOR OF ROTARY ELECTRIC MACHINE

BACKGROUND OF THE INVENTION

1. Field of the Invention

The present invention relates to a rotor of a rotary electric machine, which rotor includes a rotor core, and a permanent magnet embedded near an outer periphery of the rotor core.

2. Description of Related Art

In a permanent magnet synchronous rotary electric machine configured such that a permanent magnet is embedded in a rotor core, when a rotor heats up along with driving of the rotary electric machine, not only magnet performance decreases to decrease torque and efficiency, but also demagnetization of the permanent magnet occurs due to high temperature. If a magnet having a high coercive force is employed, a problem with demagnetization can be avoided. However, in this case, it is necessary to increase a content of heavy rare earth, which causes an increase in cost.

In view of this, in order to cool down the rotary electric machine, various structures have been suggested conventionally. For example, Japanese Patent Application Publication No. 2006-067777 (JP 2006-067777 A) describes a technique in which oil supplied from a supply oil passage formed inside a rotating shaft is discharged through a plurality of cooling oil passages formed inside a rotor core, so as to cool down a rotor. In JP 2006-067777 A, the cooling oil passage extends on a d-axis of a rotary electric machine. The cooling oil passage extending on one d-axis may be constituted by one slot extending on the d-axis from an inner peripheral end of one electromagnetic steel sheet to an outer peripheral end thereof. Alternatively, the cooling oil passage extending on one d-axis may be constituted by a plurality of slots respectively formed on a plurality of electromagnetic steel sheets arranged consecutively, which slots are arranged in respective radial ranges displaced from each other. Further, a similar technique is described in Japanese Patent Application Publication No. 2008-228523 (JP 2008-228523 A).

Further, Japanese Patent Application Publication No. 2008-228522 (JP 2008-228522 A) also describes a technique in which oil supplied from a supply oil passage formed inside a rotating shaft is discharged through a plurality of cooling oil passages formed inside a rotor core, so as to cool down a rotor. In JP 2008-228522 A, a slot extending on a q-axis of a rotary electric machine is formed on each of a plurality of electromagnetic steel sheets arranged consecutively, so that the slots are arranged in respective radial ranges displaced from each other, thereby forming a cooling oil passage extending on the q-axis.

In the meantime, as generally known, a permanent magnet synchronous rotary electric machine uses a reluctance torque other than a magnet torque of a permanent magnet. In order to secure a large magnet torque, it is necessary to secure a d-axis magnetic path that crosses a q-axis. Further, in order to secure a large reluctance torque, it is necessary to secure a q-axis magnetic path that crosses a d-axis.

However, in the conventional techniques described in JP 2006-067777 and JP 2008-228523 A, a slit functioning as a refrigerant oil passage is formed in a middle of the q-axis magnetic path, so that the slit serves as an air gap of the magnetic path, which causes a decrease in the reluctance torque. Further, in the technique of JP 2008-228522 A, a slit functioning as a refrigerant passage is formed in a middle of the d-axis magnetic path, so that the slit serves as an air gap of the magnetic path, which causes a decrease in the magnet torque.

SUMMARY OF THE INVENTION

In view of this, the present invention provides a rotor for a rotary electric machine, which rotor can improve cooling performance without degrading output performance of a motor, with a simple configuration.

A rotor related to this invention is for a rotary electric machine. The rotor includes a permanent magnet and a rotor core. The rotor core has a plurality of core refrigerant passages. The permanent magnet is embedded in the rotor core. The core refrigerant passage is configured to guide refrigerant supplied from a shaft refrigerant passage to an outer peripheral end of the rotor core such that the refrigerant is released to a gap. The gap is defined between the rotor core and a stator. The shaft refrigerant passage is provided in a rotating shaft. The core refrigerant passage includes a first refrigerant passage, a second refrigerant passage and a third refrigerant passage. The first refrigerant passage extends from an inner peripheral end of the rotor core to a position inside the permanent magnet. The first refrigerant passage is placed at a position deviating from a q-axis of the rotary electric machine in a circumferential direction. The second refrigerant passage is provided on the q-axis. The second refrigerant passage extends from the outer peripheral end of the rotor core toward an inner peripheral side in the rotor core. The third refrigerant passage configured to provide communication between the first refrigerant passage and the second refrigerant passage, the third refrigerant passage being placed at a position deviating from the second refrigerant passage in a rotor axis direction.

According to the present invention, it is possible to restrain magnetic resistances of a q-axis magnetic path and a d-axis magnetic path to be low, so that both a reluctance torque and a magnet torque can be utilized effectively. This consequently makes it possible to improve cooling performance without degrading output performance of a motor.

The third refrigerant passage may extend along the permanent magnet. The core refrigerant passage may be placed at only one position in the rotor axis direction. The first refrigerant passage may be provided on a d-axis of the rotary electric machine.

The rotor core may be configured such that electromagnetic steel sheets are laminated in the rotor axis direction. The electromagnetic steel sheets may include a first electromagnetic steel sheet and a second electromagnetic steel sheet. The second refrigerant passage is provided in the first electromagnetic steel sheet. The third refrigerant passage is provided in the second electromagnetic steel sheet. The first electromagnetic steel sheet is adjacent to the second electromagnetic steel sheet.

The third refrigerant passages may be provided side by side in the circumferential direction of the rotor core. An end of the first refrigerant passage and an end of the second refrigerant passage are each connected to two third refrigerant passages.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
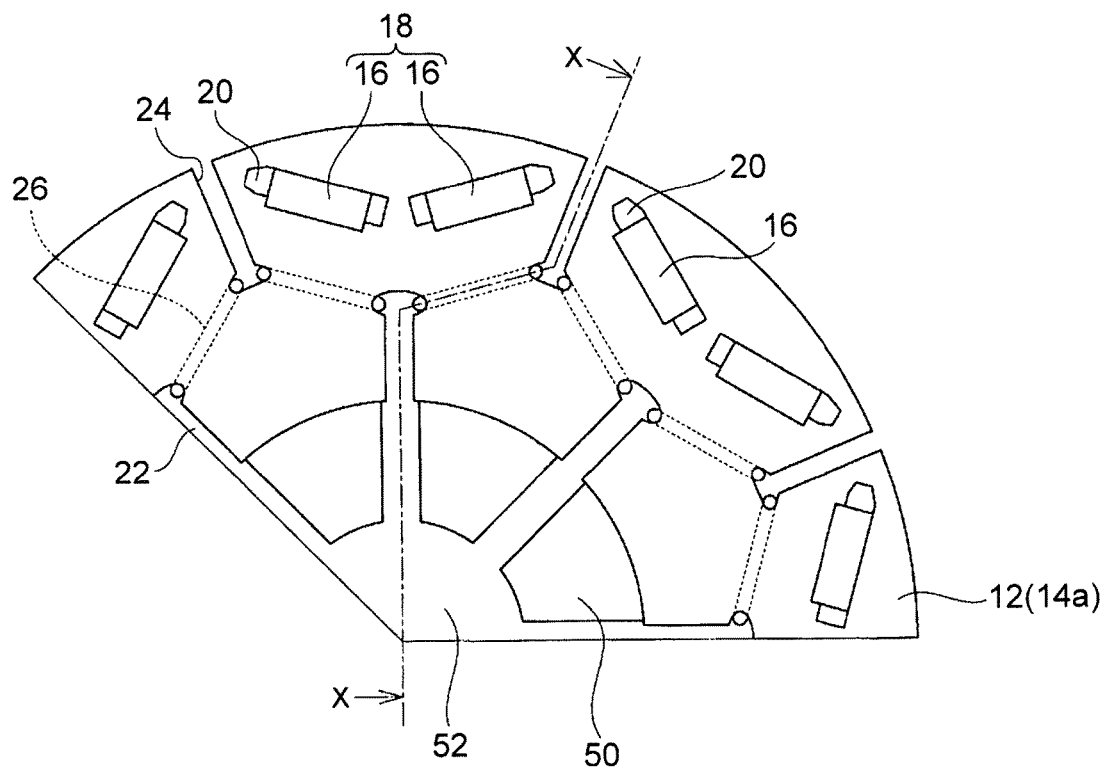
FIG. 1 is a cross-sectional view of a rotor according to an embodiment of the present invention.
Figure 2:
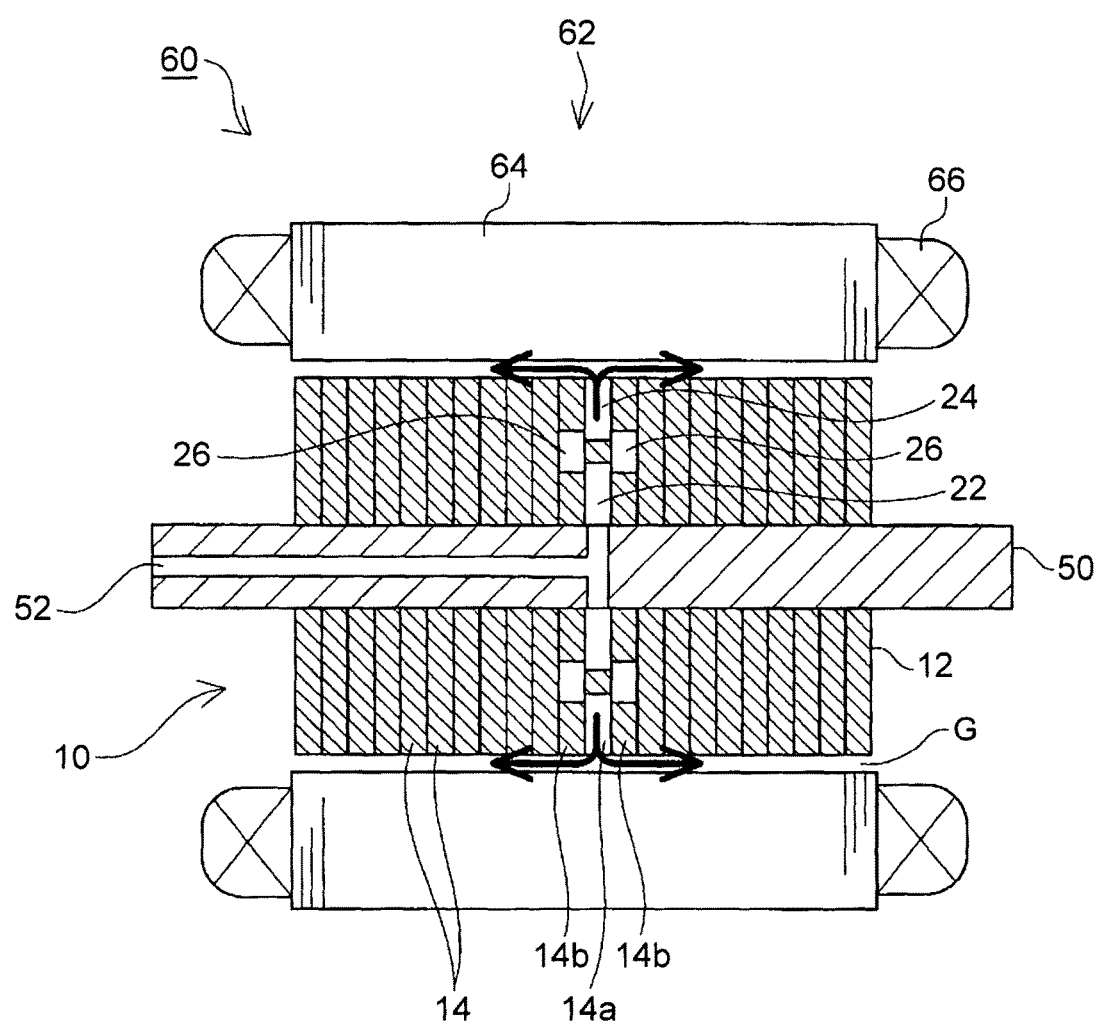
FIG. 2 is a sectional view of a rotary electric machine taken along a line X-X in FIG. 1.

An embodiment of the present invention will be described below with reference to drawings. FIG. 1 is a cross-sectional view of a rotor 10 to be used for a rotary electric machine 60 according to an embodiment of the present invention. Further, FIG. 2 is a sectional view of the rotary electric machine 60 taken along a line X-X in FIG. 1. However, in order to make the invention clearly understandable, a radial length in FIG. 2 is not the same as in FIG. 1, but is illustrated in a slightly exaggerated manner. Further, a thickness or the like of each electromagnetic steel sheet is also different from an actual thickness or the like.

The rotary electric machine 60 of the present embodiment is a permanent magnet synchronous rotary electric machine configured such that a permanent magnet 16 is embedded in a rotor core 12. The rotary electric machine 60 includes a rotor 10 and a stator 62. The stator 62 is constituted by a generally circular stator core 64 having a plurality of teeth formed on its inner periphery, and a stator coil 66 wound around each of the teeth. The rotor 10 is disposed inside the stator 62 so as to be concentric to the stator 62. A gap G having a generally uniform distance is formed between an outer peripheral surface of the rotor 10 and an inner peripheral surface of the stator 62.

The rotor 10 includes a rotor core 12, and permanent magnets 16 embedded in the rotor core 12. A rotating shaft 50 is passed through a center of the rotor core 12, and the rotating shaft 50 is supported rotatably relative to a case (not shown) via a bearing (not shown) or the like. The rotor 10 is also rotatable together with the rotating shaft 50.

The rotor core 12 is configured such that a plurality of electromagnetic steel sheets 14 is laminated in a rotor axis direction. Each of the electromagnetic steel sheets 14 has a disk shape, and is a silicon electromagnetic steel sheet, for example. A plurality of magnet holes 20 in which the permanent magnets 16 are embedded is formed near an outer periphery of the rotor core 12. The plurality of magnet holes 20 is aligned equally in a circumferential direction of the rotor core 12, and each of the magnet holes 20 penetrates through the rotor core 12 in the rotor axis direction (a vertical direction relative to a plane of paper in FIG. 1).

The permanent magnet 16 constituting a magnetic pole 18 is embedded in each of the magnet holes 20. A pair of permanent magnets 16 placed in a posture in which the pair of permanent magnets 16 expands in a generally V shape toward the outer periphery of the rotor core 12 constitutes one magnetic pole 18. In the present embodiment, 16 permanent magnets 16 and 8 magnetic poles 18 are formed near an outer peripheral end of the rotor core 12. Each of the permanent magnets 16 has a flat rectangular section, and has a plate shape having generally the same axial length as the rotor core 12. Note that the number of permanent magnets 16 and the number of magnetic poles 18 described herein are just one example, and the numbers thereof may be changed appropriately. Further, in the present embodiment, one magnetic pole 18 is constituted by a pair of permanent magnets 16, but one magnetic pole 18 may be constituted by one permanent magnet 16.

A refrigerant passage through which refrigerant to cool down the rotor 10 and the stator 62 passes is formed in the rotating shaft 50 and the rotor core 12. The refrigerant passage includes a shaft refrigerant passage 52 formed in the rotating shaft 50, and a core refrigerant passage formed in the rotor core 12. The shaft refrigerant passage 52 is a hole passing through a shaft center of the rotating shaft 50. The shaft refrigerant passage 52 extends from one end of the rotating shaft 50 to generally a center of the rotating shaft 50. The shaft refrigerant passage 52 is branched toward a radial direction generally at the center of the rotating shaft 50, so as to extend to an inner peripheral end of the rotor core 12.

The core refrigerant passage is constituted by electromagnetic steel sheets placed at a center of the rotor core 12 in an axial direction. More specifically, the core refrigerant passage is constituted by refrigerant passages formed in three electromagnetic steel sheets constituted by two types of electromagnetic steel sheets. The two types of electromagnetic steel sheets include a first steel sheet 14a and second steel sheets 14b. The first steel sheet 14a is provided with a first refrigerant passage 22 and a second refrigerant passage 24 extending in the radial direction. The second steel sheets 14b are each provided with a third refrigerant passage 26. Two second steel sheets 14b are placed so as to sandwich the first steel sheet 14a therebetween.

As illustrated in FIG. 1, the first steel sheet 14a is placed at the same rotor axis position as an end of the shaft refrigerant passage 52, so that the shaft refrigerant passage 52 communicates with the first refrigerant passage 22. Further, an outer peripheral side end of the first refrigerant passage 22 and an inner peripheral side end of the second refrigerant passage 24 communicate with ends of the third refrigerant passage 26. Accordingly, in the rotor core 12, the core refrigerant passage is formed such that the first refrigerant passage 22 is continuous with the third refrigerant passage 26, and the third refrigerant passage 26 is continuous with the second refrigerant passage 24.

The refrigerant is supplied, by a pump or the like, to the shaft refrigerant passage 52 from a refrigerant source provided outside the rotary electric machine 60. The refrigerant thus supplied to the shaft refrigerant passage 52 is then released to the gap G from the outer peripheral end of the rotor core 12 through the core refrigerant passage. The refrigerant thus released moves ahead through the gap G, and then falls to a case bottom of the rotary electric machine 60. The refrigerant thus falling to the case bottom is recovered appropriately and cooled down, and then returned back to the refrigerant source. Note that the refrigerant is not limited in particular, provided that the refrigerant is liquid that can exhibit preferred cooling performance with respect to the rotor 10 and the stator 62. However, in the present embodiment, cooling oil is used as the refrigerant.

As apparent from the above description, the refrigerant passes sequentially through inside of the rotating shaft 50, inside of the core, and the gap G. While the refrigerant passes through the gap G, heat of the rotor core 12, the magnets, and the stator core 64 are taken by the refrigerant, so as to be cooled down. In the present embodiment, in order to increase cooling efficiency and to prevent degradation of output performance of the motor, the core refrigerant passage is configured in a unique manner. This will be explained below with reference to FIG. 3.

Figure 3:
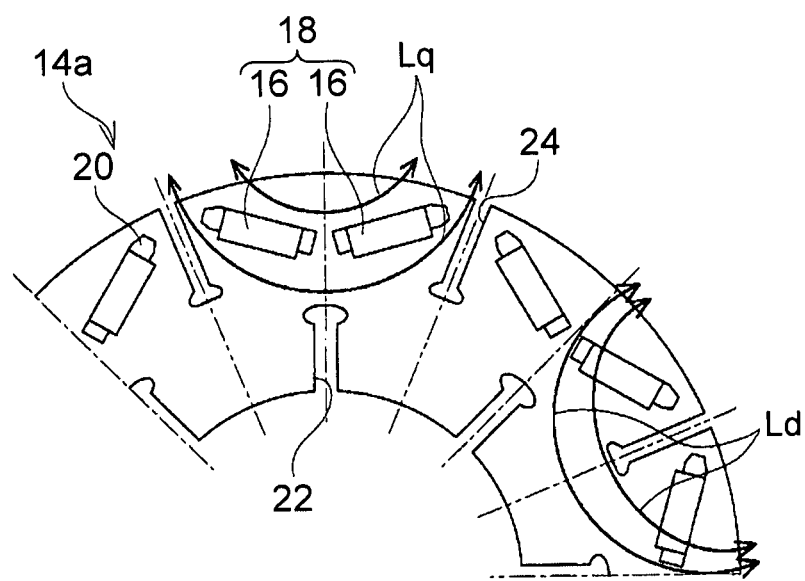
FIG. 3 is a view illustrating structures of a first steel sheet and a second steel sheet.
Figure 3:
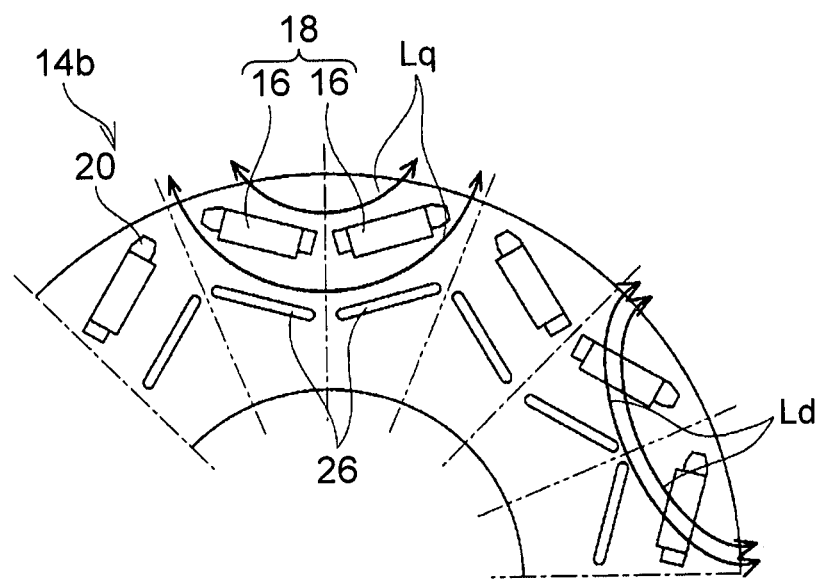

FIG. 3 is a view illustrating structures of the first steel sheet 14a and the second steel sheet 14b. Further, in FIG. 3, an alternate long and short dash line indicates a d-axis of the rotary electric machine 60, and an alternate long and two short dashes line indicates a q-axis of the rotary electric machine 60. As has been already described, the first steel sheet 14a includes two types of refrigerant passages, i.e., the first refrigerant passage 22 and the second refrigerant passage 24.

The first refrigerant passage 22 is a slit penetrating through the first steel sheet 14a. The first refrigerant passage 22 extends on the d-axis of the rotary electric machine 60, that is, on an axis passing through a central position of each magnetic pole 18 and a rotor central axis. The central position of the magnetic pole 18 is a central position between two permanent magnets 16 constituting one magnetic pole 18. As many d-axes as the magnetic poles 18 provided in the rotor 10 exist equally in the circumferential direction. Accordingly, as many first refrigerant passages 22 as the magnetic poles 18 are placed equally in the circumferential direction. The first refrigerant passage 22 extends in a d-axis direction of the rotary electric machine 60 from the inner peripheral end of the rotor core 12 to an inner peripheral position relative to the permanent magnets 16. The outer peripheral side end of the first refrigerant passage 22 expands in a generally elliptical shape.

The second refrigerant passage 24 is also a slit penetrating through the first steel sheet 14a. The second refrigerant passage 24 extends on a q-axis of the rotary electric machine 60, that is, an axis passing through a central position between adjacent magnetic poles 18 and a central axis of the rotor 10. The central position between adjacent magnetic poles 18 can be also referred to as a central position of salient poles. As many q-axes as the magnetic poles 18 provided in the rotor 10 exist equally in the circumferential direction. Accordingly, as many second refrigerant passages 24 as the magnetic poles 18 are placed at equal positions in the circumferential direction. The second refrigerant passage 24 extends in a q-axis direction from the outer peripheral end of the rotor core 12 toward an inner peripheral side of the rotor 10. The inner peripheral side end of the second refrigerant passage 24 expands in a generally triangular shape.

The second steel sheet 14b is provided with the third refrigerant passage 26. The third refrigerant passage 26 is a slit penetrating through the second steel sheet 14b. The third refrigerant passage 26 is placed at an inner peripheral position relative to the permanent magnets 16, so as to extend along the permanent magnets 16. Similarly to the permanent magnets 16, the third refrigerant passage 26 is disposed so as to expand in a generally V shape toward the outer periphery of the rotor core 12. The third refrigerant passage 26 is divided on a long axis of the first refrigerant passage 22 and on a long axis of the second refrigerant passage 24. As a result, as many third refrigerant passages 26 as the permanent magnets 16 are formed equally in the circumferential direction.

One end of each of the third refrigerant passages 26 is placed at a position where the one end overlaps with an elliptical part of the first refrigerant passage 22, i.e., the outer peripheral side end of the first refrigerant passage 22, and the other end of each of the third refrigerant passages 26 is placed at a position where the other end overlaps with a triangular part of the second refrigerant passage 24, i.e., the inner peripheral side end of the second refrigerant passage 24.

By putting the second steel sheet 14b on the first steel sheet 14a, the third refrigerant passage 26 fluidly connects the first refrigerant passage 22 to the second refrigerant passage 24. As apparent from FIG. 2, the outer peripheral side end of the first refrigerant passage 22 overlaps with one ends of two third refrigerant passages 26, so that the two third refrigerant passages 26 are connected to the outer peripheral side end of one first refrigerant passage 22. Further, the inner peripheral side end of the second refrigerant passage 24 overlaps with the other ends of two third refrigerant passages 26, so that the two third refrigerant passages 26 approaching each other from opposite sides are connected to the inner peripheral side end of one second refrigerant passage 24.

Note that, as apparent from FIG. 3, since an interval between two adjacent third refrigerant passages 26 is small, strength of the second steel sheet 14b might decrease. In view of this, in the present embodiment, respective ends of the first refrigerant passage 22 and the second refrigerant passage 24 are expanded in the radial direction. With this configuration, a wider interval between respective ends of two adjacent third refrigerant passages 26 is secured, and two third refrigerant passages 26 can be connected to one first refrigerant passage 22 or one second refrigerant passage 24.

Further, the refrigerant that has passed through one first refrigerant passage 22 is branched into four third refrigerant passages 26 in total, formed in two second steel sheets 14b, and then flows into one second refrigerant passage 24. In consideration that a pressure of the refrigerant flowing through the refrigerant passages 22, 24, 26 is kept constant, it is desirable that the first refrigerant passage 22 and the second refrigerant passage 24 have generally the same width (sectional area), and that the third refrigerant passage 26 have about one fourth of the width (sectional area) of the first refrigerant passage 22 and the second refrigerant passage 24. Note that a position of the second refrigerant passage 24 formed on the q-axis of the first steel sheet 14a is sandwiched between the magnet holes 20, and is very narrow. On that account, a sufficiently wide refrigerant passage may not be secured. Further, if the sectional area of the third refrigerant passage 26 is made small excessively, a surface resistance increases, which may cause the refrigerant not to flow smoothly. Accordingly, it is desirable to adjust the width (sectional area) of each of the refrigerant passages in consideration of the strength, the surface resistance (fluid resistance), and the like of the rotor core 12.

As apparent from the above description, the core refrigerant passage constituted by the first, second, third refrigerant passages 22, 24, 26 extends on the d-axis from the inner peripheral side end of the rotor core 12, and then extends in the rotor axis direction at the inner peripheral position relative to the permanent magnet 16. Consecutively, the core refrigerant passage extends in the circumferential direction along the permanent magnet 16, then extends in the rotor axis direction again near the q-axis, and finally extends on the q-axis to the outer peripheral side end of the rotor core 12. As such, the core refrigerant passage is configured to be bent and to extend in the rotor axis direction, appropriately. This makes it possible to improve cooling performance of the rotor 10 without degrading output performance of the rotary electric machine 60. The following describes the effect of the present invention, in comparison with a conventional technique.

Figure 8:
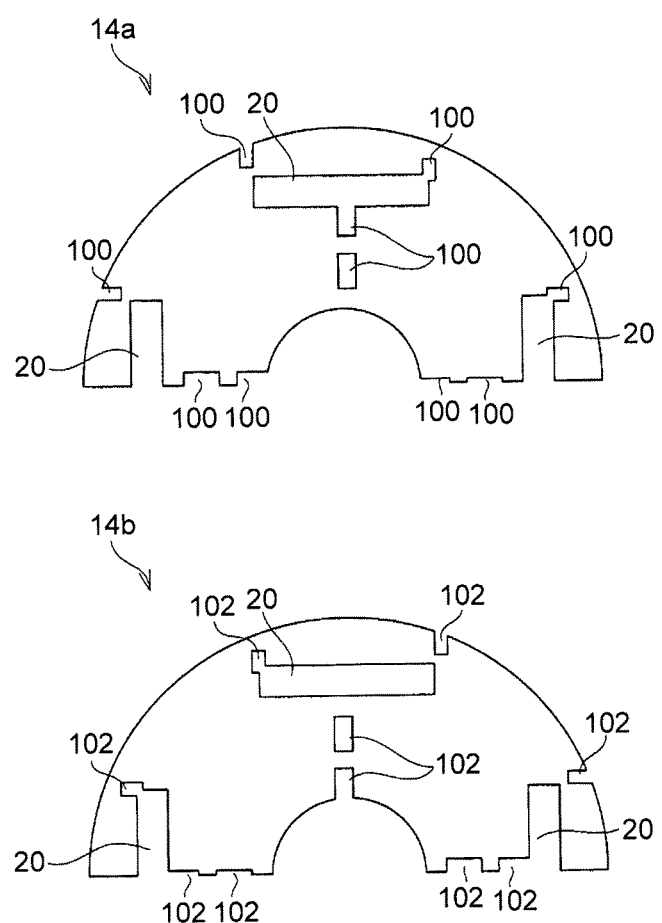
FIG. 8 is a view illustrating a configuration of an electromagnetic steel sheet of a conventional rotor.

A technique to cool down a rotor 10 and a stator 62 by forming a refrigerant passage is formed inside a rotor core 12 has been suggested conventionally. For example, JP 2006-067777 A describes that a refrigerant passage is configured such that a plurality of slits 100, 102 extending radially is formed in two electromagnetic steel sheets 14a, 14b, as illustrated in FIG. 8. In JP 2006-067777 A, the plurality of slits 100, 102 is formed on a d-axis of a rotary electric machine 60 at an inner peripheral side relative to a magnet hole 20, and is formed on both sides of the magnet hole 20 at an outer peripheral side relative to the magnet hole 20.

Figure 9:
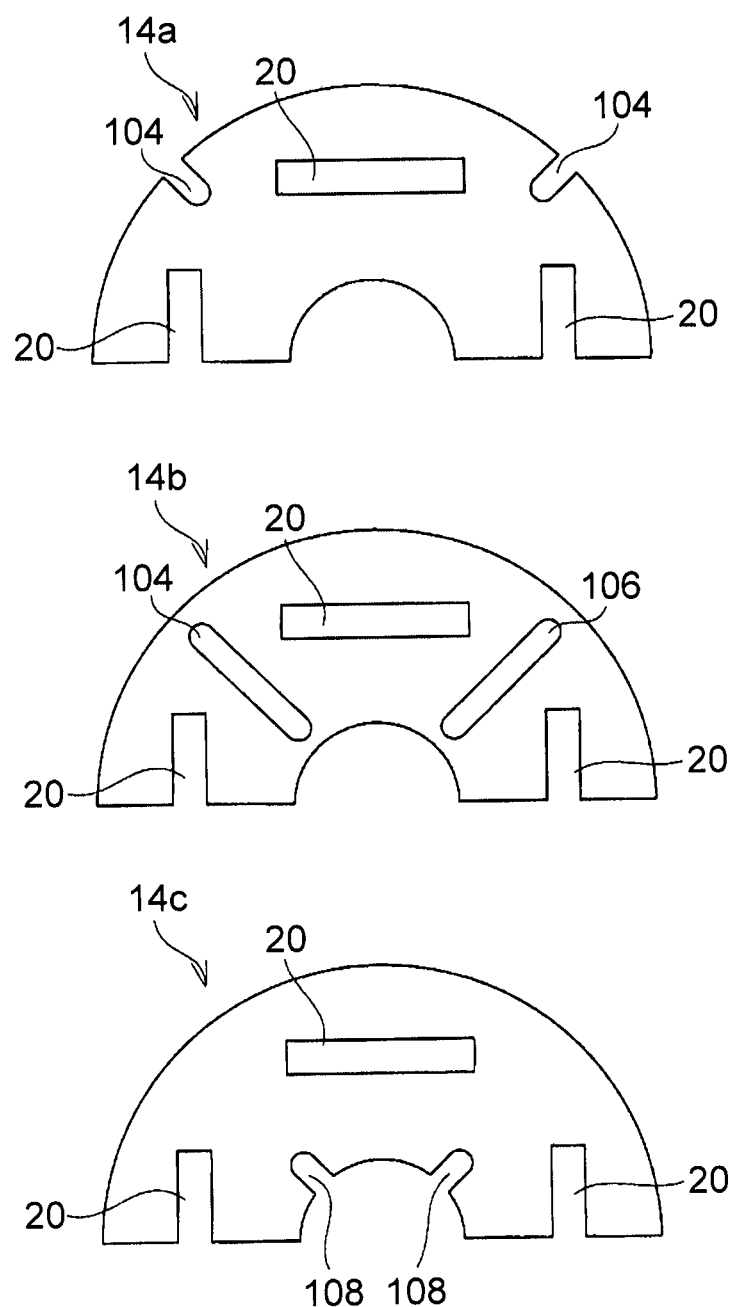
FIG. 9 is a view illustrating a configuration of an electromagnetic steel sheet of a conventional rotor.

Further, JP 2008-228522 A describes a technique in which a refrigerant passage is configured such that a plurality of slits 104, 106, 108 extending radially is formed in three electromagnetic steel sheets 14a, 14b, 14c as illustrated in FIG. 9. In JP 2008-228522 A, the plurality of slits 104, 106, 108 is formed on a q-axis of a rotary electric machine 60.

In such conventional techniques, refrigerant can be released from inside of a rotor core to a gap G, so that the rotor 10 and the stator 62 can be cooled down. However, in such conventional techniques, either a magnet torque or a reluctance torque might decrease. That is, as generally known, an IPM rotary electric machine improves output performance by effectively utilizing both the magnet torque and the reluctance torque of the permanent magnet 16. In order to utilize the magnet torque effectively, it is necessary to lower a magnetic resistance in a magnetic path (hereinafter referred to as a "d-axis magnetic path") of a flux linkage of a d-axis current. Further, in order to utilize the reluctance torque effectively, it is necessary to lower a magnetic resistance in a magnetic path (hereinafter referred to as a "q-axis magnetic path") of a flux linkage of a q-axis current.

Here, the q-axis magnetic path is a magnetic path that crosses the d-axis of the rotary electric machine 60. Because of this, when the slits 100, 102 for the refrigerant passage are formed on the d-axis as described in JP 2006-067777 A, the slits 100, 102 having a high magnetic resistance are placed in a middle of the q-axis magnetic path, which largely increases a magnetic resistance of the q-axis magnetic path and causes a decrease in the reluctance torque. Further, the d-axis magnetic path is a magnetic path that crosses the q-axis of the rotary electric machine 60. Because of this, when the slits 104, 106, 108 for the refrigerant passage are formed on the q-axis as described in JP 2008-228522 A, the slits 104, 106, 108 having a high magnetic resistance are placed in a middle of the d-axis magnetic path, which largely increases a magnetic resistance of the d-axis magnetic path and causes a decrease in the magnet torque.

It is needless to say that, in a case where the number of types of the electromagnetic steel sheets 14 is increased to constitute the refrigerant passage and a distance of a slit to be formed in one electromagnetic steel sheet 14 is shortened, even if the refrigerant passage is formed on the q-axis or the d-axis, a sufficiently wide magnetic path can be secured, so that a decrease in the magnet torque and a reluctance can be prevented. However, in that case, it is necessary to prepare several different types of the electromagnetic steel sheets 14 having different slit formation positions, which causes a problem with an increase in the number of types of components and an increase in labor for assembly.

Further, as described in JP 2008-228522 A, in a case where the refrigerant passage is formed only on the q-axis, the refrigerant does not flow near the permanent magnet 16, which causes a problem that cooling efficiency of the permanent magnet 16 decreases. When a temperature of the permanent magnet 16 increases excessively, not only the magnet torque decreases, but also demagnetization of the magnet occurs, which causes performance degradation of the rotary electric machine 60. Such demagnetization can be prevented by employing a magnet having a high coercive force. However, in this case, it is necessary to increase a content of heavy rare earth, which causes an increase in cost.

In the present embodiment, in order to avoid such a problem and improve cooling performance of the rotor 10 without degrading output performance of the rotary electric machine 60, the core refrigerant passage is configured to be bent and to extend in the rotor axis direction, appropriately. That is, as illustrated in FIG. 3, the flux linkage of the d-axis current to cause a magnet torque travels in the rotor core 12 to pass through a center of one magnetic pole 18, and then goes out of the rotor core 12 to pass through a center of another magnetic pole 18 adjacent to the one magnetic pole 18. Accordingly, a d-axis magnetic path Ld becomes a magnetic path that crosses the q-axis of the rotary electric machine 60. In the present embodiment, in order not to obstruct the d-axis magnetic path Ld, the third refrigerant passage 26 extending in the circumferential direction and the second refrigerant passage 24 extending on the q-axis are formed in different electromagnetic steel sheets 14, and the second refrigerant passage 24 is extended only in a middle of the electromagnetic steel sheet 14 in the radial direction. Accordingly, in the first steel sheet 14a, an area from the inner peripheral side end of the second refrigerant passage 24 to an inner peripheral end of the electromagnetic steel sheet 14 can be used as the d-axis magnetic path Ld, and thus, the d-axis magnetic path can be kept wide. Further, in the second steel sheet 14b, a refrigerant passage is formed not on the q-axis, so that no refrigerant passage that divides the d-axis magnetic path Ld exists. This consequently makes it possible to restrain a magnetic resistance of the d-axis magnetic path Ld to be low.

Further, the flux linkage of the q-axis current to cause a reluctance torque travels in the rotor core 12 from a salient pole formed between the magnetic poles 18 to pass through its adjacent salient pole, and then goes out of the rotor core 12. In the present embodiment, the first refrigerant passage 22 extending on the q-axis is extended only to an inner peripheral position relative to the permanent magnet 16, so as not to obstruct the q-axis magnetic path Lq, and the third refrigerant passage 26 is configured to travel at the inner peripheral position relative to the permanent magnet 16. Accordingly, in the first steel sheet 14a, an area between the inner peripheral end of the first refrigerant passage 22 and the permanent magnet 16 can be used as the q-axis magnetic path Lq, so that the q-axis magnetic path Lq is not divided by the refrigerant passage. Further, in the second steel sheet 14b, since the third refrigerant passage 26 extends in a direction generally parallel to the flux linkage of the q-axis current, the q-axis magnetic path Lq is not divided by the refrigerant passage, thereby consequently making it possible to restrain a magnetic resistance to be low. That is, according to the present embodiment, since both the d-axis magnetic path Ld and the q-axis magnetic path Lq are not divided by the refrigerant passage, both the magnet torque and the reluctance torque can be utilized effectively, thereby eventually making it possible to prevent degradation of the output performance of the rotary electric machine 60.

Further, in the present embodiment, the third refrigerant passage 26 is formed along the permanent magnet 16, and the refrigerant flows through the third refrigerant passage 26. This makes it possible to effectively cool down the permanent magnet 16, thereby making it possible to prevent performance degradation and demagnetization of the permanent magnet 16. Further, as apparent from the above description, in the present embodiment, the refrigerant passage that guides the refrigerant from the inner peripheral end of the rotor core 12 to the outer peripheral end thereof is constituted by two types of the electromagnetic steel sheets 14a, 14b. Accordingly, it is not necessary to prepare various electromagnetic steel sheets having different formation positions of refrigerant passages, so that the number of types of components can be reduced and the labor for assembly can be reduced.

Further, in the present embodiment, the core refrigerant passage is provided only in one place in the rotor axis direction. In other words, a plurality of core refrigerant passages is placed at the same position in the rotor axis direction. With such a configuration, it is possible to prevent the refrigerant from being retained in the gap G, and eventually to reduce a drag loss. That is, in a case where the core refrigerant passages are provided at two or more places in the rotor axis direction, refrigerant ejected to the gap G from the core refrigerant passage at one of the places interferes with refrigerant ejected to the gap G from the core refrigerant passage at another one of the places. As a result, the refrigerant does not flow outside the gap G quickly, but is retained in the gap G. In this case, the refrigerant serves as a rotational resistance of the rotor 10, which increases a drag loss. In the meantime, as described in the present embodiment, when the core refrigerant passage is provided only at one place in the rotor axis direction, the refrigerant ejected to the gap G from the core refrigerant passage is quickly discharged outside the gap G, without interfering with other refrigerant. As a result, the drag loss can be reduced, and the efficiency of the rotary electric machine 60 can be improved more.

Note that the configuration described so far is an example, and the other configurations may be changed appropriately, provided that the core refrigerant passage includes at least the first refrigerant passage 22 extending from the inner peripheral end of the rotor core 12 to an inner part of the rotor core 12 at a position deviating from the q-axis in the circumferential direction, the second refrigerant passage 24 extending on the q-axis from the outer peripheral end of the rotor core 12 to the inner part of the rotor core 12, and the third refrigerant passage 26 extending in the circumferential direction so as to connect the first refrigerant passages 22 to the second refrigerant passages 24; and the second refrigerant passage 24 and the third refrigerant passage 26 are placed at positions that do not overlap with each other in the rotor axis direction.

For example, in the present embodiment, the second steel sheets 14b provided with the third refrigerant passage 26 are disposed on both sides of the first steel sheet 14a provided with the first, second refrigerant passages 22, 24, and thus, two second steel sheets 14b are provided. However, one second steel sheet 14b may be provided. In a case where only one second steel sheet 14b is provided, it is desirable that a width (sectional area) of the third refrigerant passage 26 formed in the second steel sheet 14b be broadened by just that much.

Figure 4:
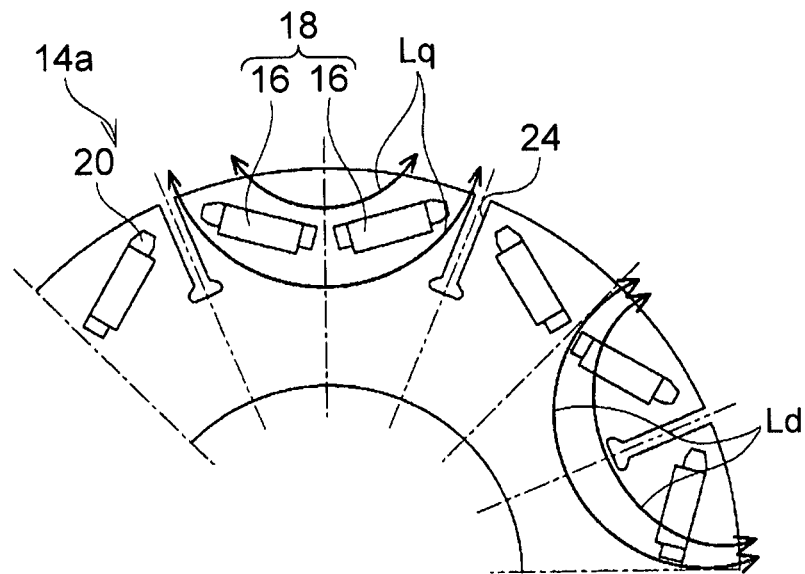
FIG. 4 is a view illustrating another structures of the first steel sheet and the second steel sheet.
Figure 4:
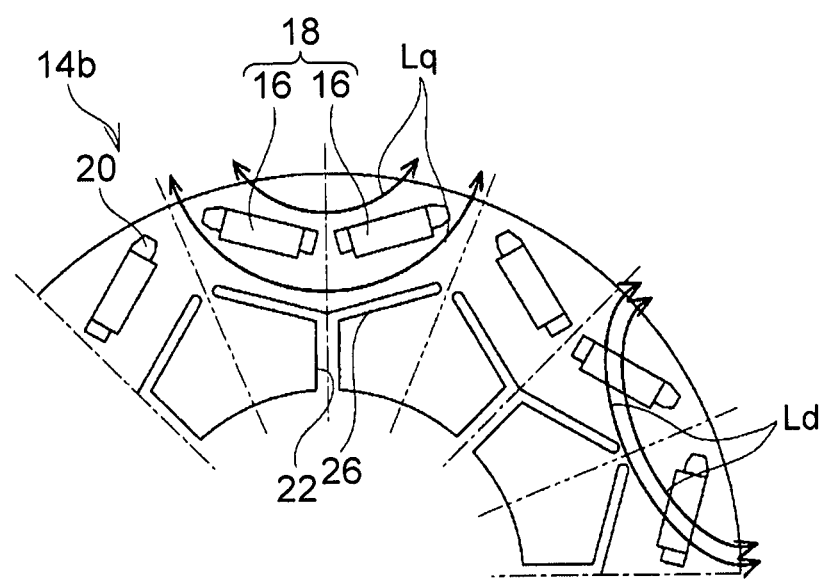

Further, the first refrigerant passage 22, the third refrigerant passage 26, and the second refrigerant passage 24 may be formed in different electromagnetic steel sheets 14, provided that the second refrigerant passage 24 and the third refrigerant passage 26 are formed in different electromagnetic steel sheets 14 adjacent to each other. Further, the first refrigerant passage 22 may be formed in the same electromagnetic steel sheet 14 as the third refrigerant passage 26. That is, as illustrated in FIG. 4, only the second refrigerant passage 24 may be formed in the first steel sheet 14a, and the first refrigerant passage 22 and the third refrigerant passage 26 may be formed in the second steel sheet 14b.

Further, in the above description, the refrigerant passage is constituted by a slit penetrating through the electromagnetic steel sheet 14. However, the refrigerant passage may be constituted by a groove that does not penetrate through the electromagnetic steel sheet 14, instead of the slit. Further, the present embodiment exemplifies only the rotor core 12 made of a laminated steel sheet formed by laminating the electromagnetic steel sheets 14. However, the rotor core 12 may be made of a dust core or the like other than the laminated steel sheet, provided that a characteristic of strength and a magnetic property can be maintained, for example.

Figure 5:
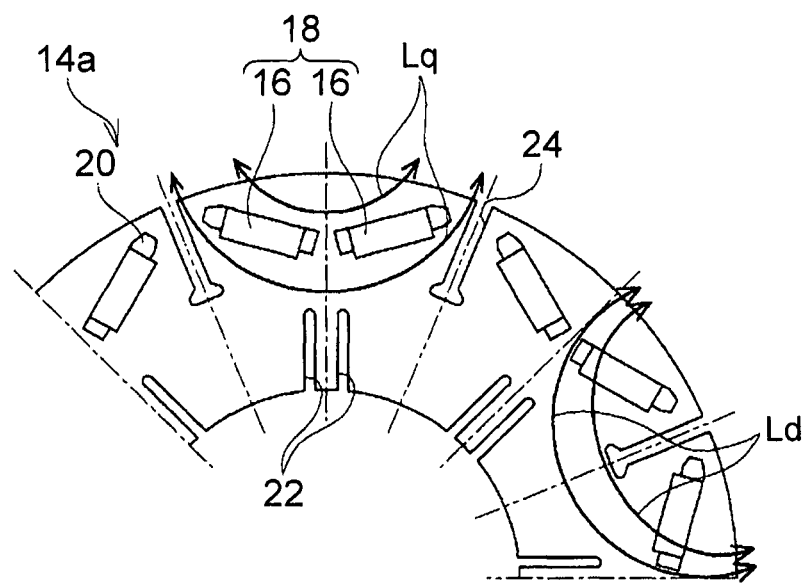
FIG. 5 is a view illustrating another structures of the first steel sheet and the second steel sheet.
Figure 5:
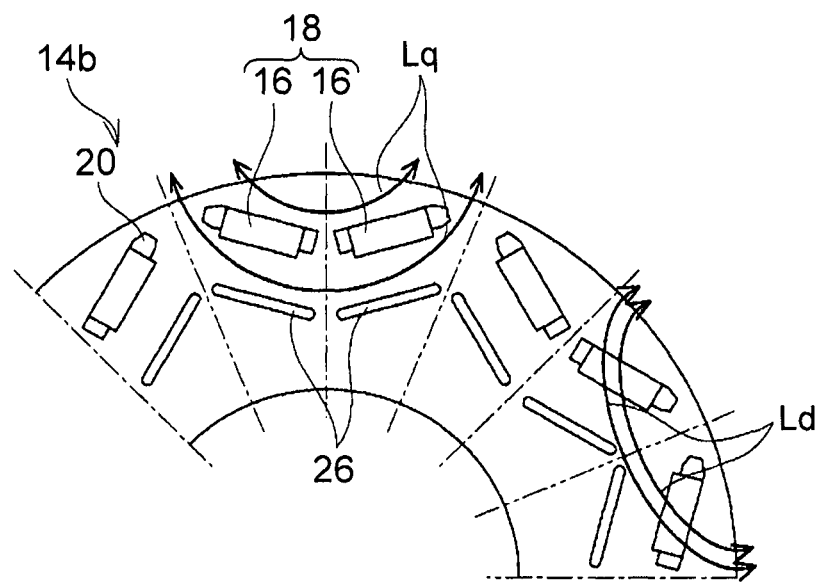

Further, in the present embodiment, the first refrigerant passage 22 is placed on the d-axis. However, the first refrigerant passage 22 may not be provided on the d-axis but may be provided on other places, provided that the first refrigerant passage 22 is formed at a position deviating from the q-axis in a rotor circumferential direction. For example, as illustrated in FIG. 5, two first refrigerant passages 22 may be provided on opposite sides across the d-axis. However, in consideration of the cooling efficiency of the permanent magnet 16, in order that a distance of the third refrigerant passage 26 extending along the permanent magnet 16 becomes long, it is desirable that the outer peripheral side end of the first refrigerant passage 22 be positioned on the d-axis if possible. Further, in consideration of the strength of electromagnetic steel sheet 14, it is desirable that the number of the first refrigerant passages 22 be as small as possible.

Figure 6:
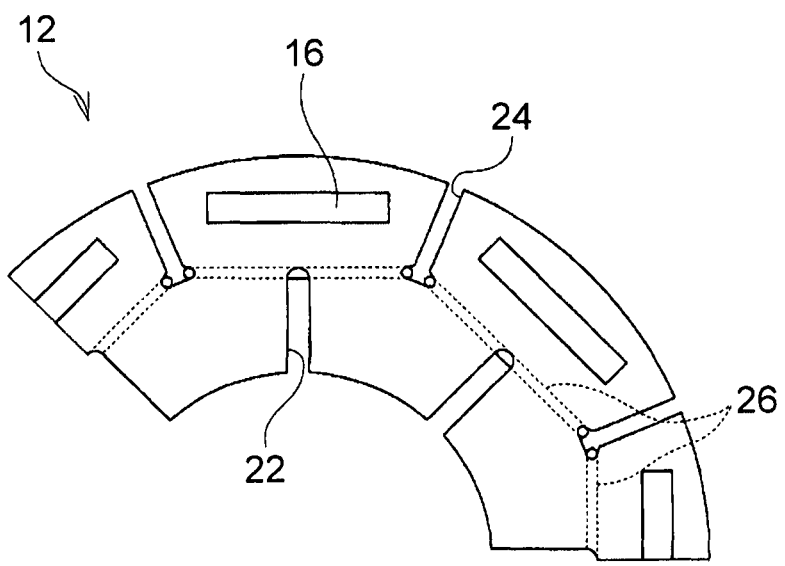
FIG. 6 is a cross-sectional view of a rotor core according to another embodiment.
Figure 7:
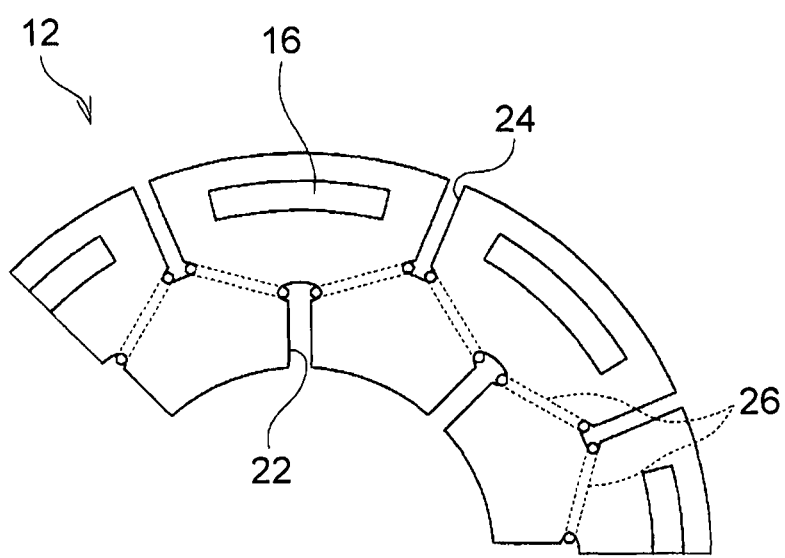
FIG. 7 is a cross-sectional view of a rotor core according to another embodiment.

Further, in the above description, only the rotor 10 in which the permanent magnets 16 are disposed in a V-shape is exemplified. However, the permanent magnets 16 may have a rectangular shape or an arc shape as illustrated in FIGS. 6, 7, provided that the rotor 10 is configured such that the permanent magnets 16 are embedded in the rotor core 12. Further, in the embodiment in FIG. 1, the third refrigerant passage 26 is divided on the d-axis (the long axis of the first refrigerant passage 22) and on the q-axis (the long axis of the second refrigerant passage 24). However, the third refrigerant passage 26 may be continued appropriately, provided that the third refrigerant passage 26 extends in the rotor circumferential direction so as to connect the first refrigerant passage 22 to the second refrigerant passage 24. For example, as illustrated in FIG. 6, the third refrigerant passage 26 may be a refrigerant passage configured not to be divided on the d-axis, but to extend continuously from one q-axis to another q-axis adjacent thereto. However, in order to secure the strength of the electromagnetic steel sheet 14, it is desirable for the third refrigerant passage 26 to be divided both on the d-axis and on the q-axis.

In any case, the first refrigerant passage 22 extending from the inner peripheral end of the rotor core 12 at a position deviating from the q-axis in the rotor circumferential direction, the second refrigerant passage 24 extending from the outer peripheral end of the rotor core 12 on the q-axis, and the third refrigerant passages 26 extending in the circumferential direction so as to fluidly communicate the first refrigerant passage 22 to the second refrigerant passage 24 may be provided so that the second refrigerant passage 24 and the third refrigerant passage 26 are displaced from each other in the rotor axis direction. With such a configuration, it is possible to restrain magnetic resistances of both the q-axis magnetic path and the d-axis magnetic path to be low. This consequently makes it possible to improve the cooling performance of the rotor 10 without degrading the output performance of the rotary electric machine 60.

The invention claimed is:

1. A rotor for a rotary electric machine, the rotor comprising:
a permanent magnet;
a rotor core having a plurality of core refrigerant passages, the permanent magnet being embedded in the rotor core, the core refrigerant passage being configured to guide refrigerant supplied from a shaft refrigerant passage to an outer peripheral end of the rotor core such that the refrigerant is released to a gap, the gap being defined between the rotor core and a stator, the shaft refrigerant passage being provided in a rotating shaft, the core refrigerant passage including:
a first refrigerant passage extending from an inner peripheral end of the rotor core to a position radially inward of the permanent magnet, the first refrigerant passage being placed at a position deviating from a q-axis of the rotary electric machine in a circumferential direction,
a second refrigerant passage provided on the q-axis, the second refrigerant passage extending from the outer peripheral end of the rotor core toward an inner peripheral side in the rotor core, and
a third refrigerant passage configured to provide communication between the first refrigerant passage and the second refrigerant passage, the third refrigerant passage being placed at a position deviating from the second refrigerant passage in a rotor axis direction.

2. The rotor according to claim 1, wherein
the third refrigerant passage extends along the permanent magnet.

3. The rotor according to claim 1, wherein
the core refrigerant passage is placed at only one position in the rotor axis direction.

4. The rotor according to claim 1, wherein
the first refrigerant passage is provided on a d-axis of the rotary electric machine.

5. The rotor according to claim 1, wherein
the rotor core is configured such that electromagnetic steel sheets are laminated in the rotor axis direction,
the electromagnetic steel sheets include a first electromagnetic steel sheet and a second electromagnetic steel sheet,
the second refrigerant passage is provided in the first electromagnetic steel sheet,
the third refrigerant passage is provided in the second electromagnetic steel sheet, and
the first electromagnetic steel sheet is adjacent to the second electromagnetic steel sheet.

6. The rotor according to claim 5, wherein
the first refrigerant passage is provided in the first electromagnetic steel sheet.

7. The rotor according to claim 1, wherein:
the third refrigerant passages are provided side by side in the circumferential direction of the rotor core; and
an end of the first refrigerant passage and an end of the second refrigerant passage are each connected to two third refrigerant passages.

* * * * *